(12) United States Patent
Ishikawa

(10) Patent No.: US 9,823,470 B2
(45) Date of Patent: Nov. 21, 2017

(54) VEHICLE HEAD-UP DISPLAY DEVICE

(71) Applicant: DENSO CORPORATION, Kariya, Aichi-pref. (JP)

(72) Inventor: Toshiki Ishikawa, Kariya (JP)

(73) Assignee: DENSO CORPORATION, Kariya, Aichi (JP)

(*) Notice: Subject to any disclaimer, the term of this patent is extended or adjusted under 35 U.S.C. 154(b) by 0 days.

(21) Appl. No.: 14/909,908

(22) PCT Filed: Jul. 30, 2014

(86) PCT No.: PCT/JP2014/003993
§ 371 (c)(1),
(2) Date: Feb. 3, 2016

(87) PCT Pub. No.: WO2015/019578
PCT Pub. Date: Feb. 12, 2015

(65) Prior Publication Data
US 2016/0178901 A1      Jun. 23, 2016

(30) Foreign Application Priority Data
Aug. 6, 2013  (JP) ................................ 2013-163503

(51) Int. Cl.
*G09G 5/00* (2006.01)
*G02B 27/01* (2006.01)
(Continued)

(52) U.S. Cl.
CPC .......... *G02B 27/0101* (2013.01); *B60K 35/00* (2013.01); *G02B 5/30* (2013.01);
(Continued)

(58) Field of Classification Search
CPC .... G02B 2027/0107; G02B 2027/0181; G02B 2027/0196; G02B 27/01; G02B 27/0101; G02B 27/0172
(Continued)

(56) References Cited

U.S. PATENT DOCUMENTS

2003/0214724 A1    11/2003  Fujikawa et al.
2013/0050834 A1*   2/2013   Fujikawa ........... G02B 27/0101
                                                   359/630
(Continued)

FOREIGN PATENT DOCUMENTS

JP    H01125486 U    8/1989
JP    H11310055 A    11/1999
(Continued)

OTHER PUBLICATIONS

International Search Report and Written Opinion (in Japanese with English Translation) for PCT/JP2014/003993, dated Oct. 21, 2014; ISA/JP.

*Primary Examiner* — Jennifer Nguyen
(74) *Attorney, Agent, or Firm* — Harness, Dickey & Pierce, P.L.C.

(57) ABSTRACT

In a vehicle head-up display device that reflects a display light transmitted through a dust-proof cover on a windshield or a combiner, and viewably displays display information as a virtual image from a driver's seat of a vehicle, the dust-proof cover has a light transmissive property produced by being rolled, when a line between a first point a first end side of the display in a longitudinal direction of the display and a second point being at the same height as the first point in a second end side opposite to the first end side is a longitudinal axis, and a luminance of a virtual image is adjusted by adjusting an angle between a rolling direction of a resin sheet used for the dust-proof cover and a virtual image longitudinal axis, which corresponds to the longitudinal axis, of a virtual image of the display reflected by the reflector. As a result, a polarization state of the display light
(Continued)

is changed to enable the luminance of the virtual image to be adjusted without any increase in the number of parts and a body size.

8 Claims, 12 Drawing Sheets

(51) Int. Cl.
*B60K 35/00* (2006.01)
*G02B 5/30* (2006.01)
*G02B 27/00* (2006.01)

(52) U.S. Cl.
CPC ..... *G02B 27/0006* (2013.01); *G02B 27/0149* (2013.01); *G02B 2027/0118* (2013.01); *G02B 2027/0154* (2013.01)

(58) Field of Classification Search
USPC .................................................. 345/7; 349/11
See application file for complete search history.

(56) References Cited

U.S. PATENT DOCUMENTS

| | | | |
|---|---|---|---|
| 2015/0130853 A1* | 5/2015 | Hada | H04N 9/3155 345/690 |
| 2015/0226964 A1* | 8/2015 | Sasaki | G02B 27/0149 359/631 |

FOREIGN PATENT DOCUMENTS

| | | |
|---|---|---|
| JP | 2000028957 A | 1/2000 |
| JP | 2004020605 A | 1/2004 |
| JP | 2004-170737 A | 6/2004 |
| JP | 2007069771 A | 3/2007 |
| JP | 2008-242430 A | 10/2008 |
| JP | 2010113197 A | 5/2010 |
| JP | 2013032087 A | 2/2013 |

* cited by examiner

VEHICLE HEAD-UP DISPLAY DEVICE

CROSS-REFERENCE TO RELATED APPLICATIONS

This application is a U.S. National Phase Application under 35 U.S.C. 371 of International Application No. PCT/JP2014/003993 filed on Jul. 30, 2014 and published in Japanese as WO 2015/019578 A1 on Feb. 12, 2015. This application is based on and claims the benefit of priority from Japanese Patent Application No. 2013-163503 filed on Aug. 6, 2013. The entire disclosures of all of the above applications are incorporated herein by reference.

TECHNICAL FIELD

The present disclosure relates to a vehicle head-up display device that reflects an image displayed on a display toward a windshield or a combiner of a vehicle, and viewably displays a virtual image of the image from an eye point in a vehicle interior.

BACKGROUND ART

A conventional vehicle head-up display device disclosed in, for example, PTL 1 has been known. The vehicle head-up display device in PTL 1 includes a liquid crystal display panel and a light emitting element that illuminates the liquid crystal display panel. The vehicle head-up display device projects a display light including a linearly polarized light onto a windshield to display the virtual image.

The vehicle head-up display device of PTL 1 rotates a polarization axis of the display light by a retardation plate, which is separately prepared, to improve the visibility of the virtual image as viewed over sunglasses.

PRIOR ART LITERATURE

Patent Literature

PTL 1: JP 2010-113197 A

SUMMARY OF THE INVENTION

As described above, in PTL 1, because the retardation plate is provided separately, a body size of the device tends to be large, resulting in a deteriorated mountability of the vehicle.

In view of the above circumstances, an object of the present disclosure is to provide a vehicle head-up display device that is capable of adjusting the luminance of a virtual image without any increase in the body size.

The present disclosure employs the following technical means.

A head-up display device according to a first aspect includes: a casing that is disposed close to a driver's seat of a vehicle and has an opening, the vehicle having a windshield or a combiner disposed separately from the windshield; a light emitting element that is housed in the casing; a display that is housed in the casing and emits a display light indicating display information upon receiving a light emitted by the light emitting element; a reflector that is housed in the casing and reflects the display light; and a dust-proof cover that is disposed in the opening, wherein the display light transmitted through the dust-proof cover is reflected on the windshield or the combiner, whereby the display information is displayed as a virtual image to be visible from the driver's seat of the vehicle, the dust-proof cover, which is formed by being rolled, has a light transmission property, a line passing between a first point in a first end side of the display in a longitudinal direction of the display and a second point in a second end side of the display opposite to the first end side is defined as a longitudinal axis, the second point being at a same height as the first point, an angle between a rolling direction of a resin sheet used for the dust-proof cover and a virtual image longitudinal axis, which corresponds to the longitudinal axis, of the virtual image of the display reflected by the reflector is defined as an angle $\alpha$, and a luminance of the virtual image is adjusted by adjusting the angle $\alpha$.

Accordingly, an optical rotation effect of the dustproof cover can be expected through the adjustment of the angle $\alpha$. Therefore, with an appropriate change in the angle $\alpha$, a polarization state of the display light emitted by the display can be adjusted without any increase in the body size.

In a second aspect of the head-up display device, a luminance of the light emitting element is $I_0$, a transmittance of the display is $T_{TFT}$, a reflectance of the reflector is R, an angle between the longitudinal axis and a polarization direction of the display light is $\theta_{LCD}$, an angle between a virtual plane and a plane is defined as an angle $\Delta\theta$, the virtual plane being defined by an incident light and a reflected light of the display light when reflected on the windshield or the combiner, and the plane being perpendicular to the virtual image longitudinal axis of the virtual image of the display reflected by the reflector, a reflectance of an s-polarized light on the windshield or the combiner is Rs, a reflectance of a p-polarized light on the windshield or the combiner is Rp, values determined by a characteristic of the dust-proof cover are $A_1$ and $A_2$, a luminance I of the display information, when visually recognized as the virtual image from the driver's seat, is represented by the following Expression 1, and the angle $\alpha$ is selected so that the luminance I falls within a range of from 65% to 90% of a maximum value of the luminance I.

$$I=(I_0 \cdot T_{TFT} \cdot R) \times [Rs \cdot \{A_1 \cos^2(\theta_{LCD}+\Delta\theta-2\alpha)+A_2 \cos^2(\theta_{LCD}+\Delta\theta)\}+Rp \cdot \{A_1 \sin^2(\theta_{LCD}+\Delta\theta-2\alpha)+A_2 \sin^2(\theta_{LCD}+\Delta\theta)\}]$$

[Expression 1]

Accordingly, with the selection of the angle $\alpha$, both a sum of the luminance of an s-polarized light and a p-polarized light when a driver views the virtual image with his naked eyes, and the luminance of the p-polarized light when viewing the virtual image through polarized sunglasses can be adjusted to a permissible level for the driver by the light rotation effect caused by the dustproof cover without any increase in the body size.

In a third aspect of the head-up display device, the luminance I of the display information is represented by the above Expression 1, and the angle $\alpha$ is selected so that the luminance I becomes a value other than a maximum value and a minimum value of the luminance I.

Accordingly, by setting the angle $\alpha$, it is possible to avoid a situation, without any increase in the body size, where one of a sum of the luminance of an s-polarized light and a p-polarized light when a driver views the virtual image with his naked eyes, and the luminance of the p-polarized light when viewing the virtual image through polarized sunglasses is extremely lowered.

In a fourth aspect of the head-up display device, the luminance I of the display information is represented by the above Expression 1, and the angle $\alpha$ is selected so that the luminance I has a maximum value of the luminance I.

Accordingly, the sum of the luminance of the s-polarized light and the p-polarized light when the driver views the virtual image with his naked eyes can be adjusted to have a maximum value.

EMBODIMENTS FOR CARRYING OUT INVENTION

Figure 1:
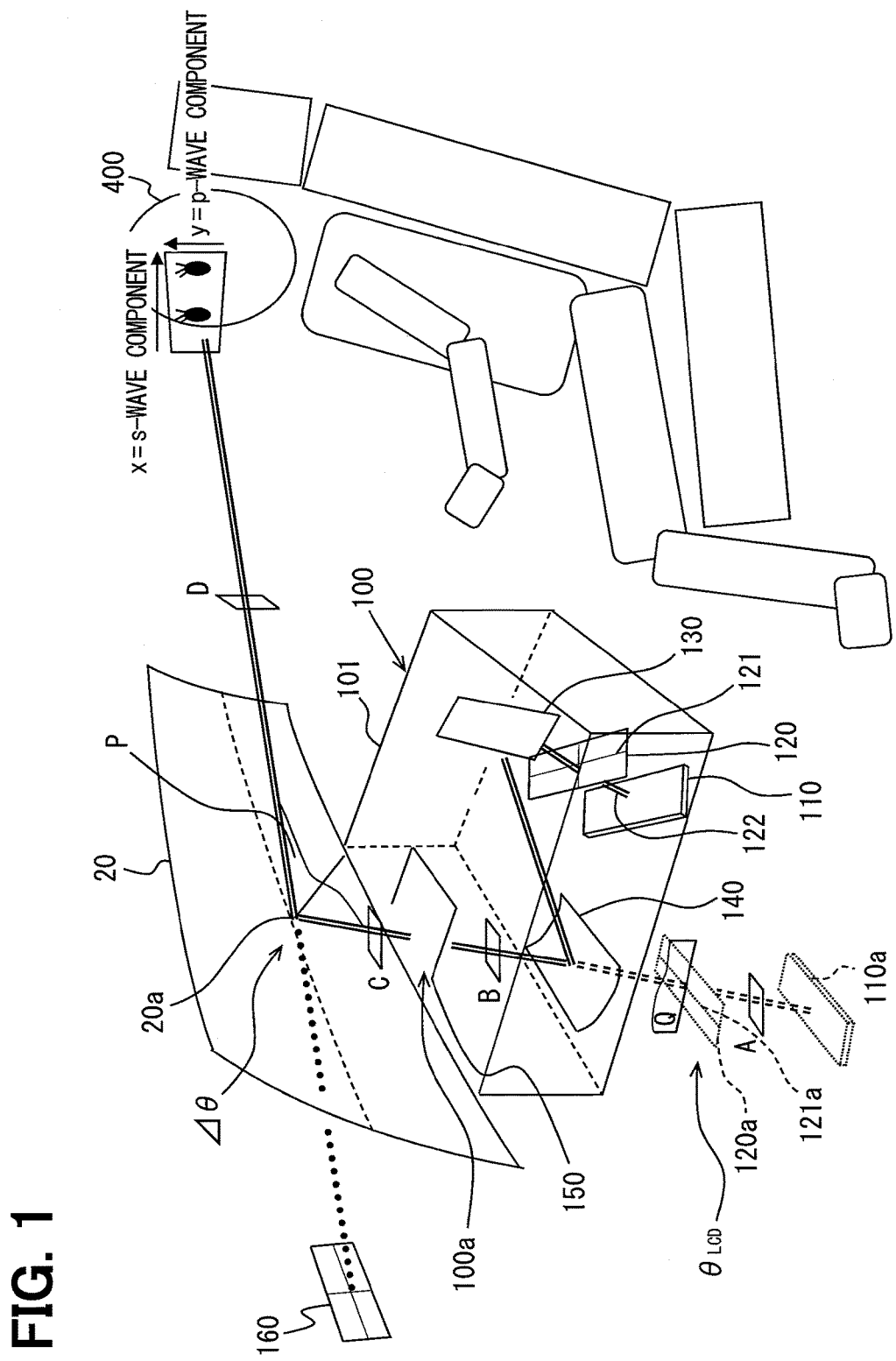
FIG. 1 is an overall configuration diagram of a vehicle head-up display device according to a first embodiment.

Hereinafter, plural embodiments for carrying out the present disclosure will be described with reference to the drawings. In each embodiment, there is a case where the parts which correspond to the contents described in previous embodiments are given the same reference numerals, and overlapping description thereof is omitted. In each embodiment, when only a part of the configuration is described, another embodiment previously described can be employed for other parts of the configuration. The embodiments may be partially combined even if it is not explicitly described that the embodiments can be combined, provided there is no harm in the combination.

(First Embodiment)

A vehicle head-up display device 100 according to a first embodiment will be described with reference to FIGS. 1 to 9. As illustrated in FIG. 1, a vehicle head-up display device 100 has a display 120 housed in a casing 101. A display light indicating display information is emitted from the display 120. The emitted display light is projected onto a projection position 20a of a windshield 20 for a vehicle. The vehicle head-up display device 100 generates a display image 160 of display information on a vehicle front extension line of a line between an eye box 400a and a projection position 20a. With the above configuration, the display image 160 is visually recognized as a virtual image by a driver 400. In this example, the eye box 400a is set in a predetermined area set in a vehicle interior in advance. Specifically, the eye box 400a is set as an area where eyes of the driver 400 are positioned during driving. The driver 400 can visually recognize the display image 160 and a foreground of the vehicle in a superimposed manner by the vehicle head-up display device 100. Hereinafter, the vehicle head-up display device 100 is called "HUD 100".

The windshield 20 is a front windshield of the vehicle, and is made of, for example, a laminated glass having two glasses and an intermediate film disposed between those glasses. The windshield 20 has slight curvatures along a horizontal direction when viewed from above of the vehicle, and along a line of the windshield 20 when viewed from a side of the vehicle. The windshield 20 is designed to enlarge the display image 160 due to the effect of a concave mirror to display the display image 160 at some distance. In the windshield 20, a reflectance of the s-polarized light is Rs (hereinafter referred to as "s-polarized light reflectance Rs"), and a reflectance of the p-polarized light is Rp (hereinafter referred to as "p-polarized light reflectance Rp").

The casing 101 of the HUD 100 is disposed inside of an instrument panel extending from a lower portion of the windshield 20 into a vehicle interior. The HUD 100 is equipped with a light emitting element 110, the display 120, a reflector 130, a concave mirror 140, a dust-proof cover 150, and a controller not shown. Next, the respective configurations of the HUD 100 will be described in detail.

The light emitting element 110 is energized to emit a light to the display 120. The light emitting element is formed of, for example, a light emitting diode (light emitting diode=LED). In the following description, the luminance of light emitted by the light emitting element 110 is defined as $I_0$ (hereinafter called "light emitting element luminance $I_0$).

The display 120 emits a display light indicating display information. The display 120 is operated under control by a driver circuit of the controller not shown. The display 120 is formed of, for example, a TFT liquid crystal panel using thin film transistors (thin film transistors=TFTs), a dual scan display (dual scan super twisted nematic=D-STN), or a TN (twisted nematic) segment liquid crystal. The display 120 forms display information on a surface of the display 120 from the light emitted by the light emitting element 110 and emits, as the display light, the display information in a direction opposite to the light emitting element 110.

The display information provided by the display 120 is vehicle information when the vehicle in travel, such as a vehicle velocity, an engine rotation speed, an engine coolant temperature, a battery voltage, and a speed limit. The display 120 can provide a variety of display information described above on the surface of the display 120 one by one or in combination of multiple display information. The driver 400 can select any display information by a changeover switch not illustrated.

In the display 120, a transmittance for the light of the light emitting element 110 is represented as $T_{TFT}$ (hereinafter referred to as "transmittance $T_{TFT}$"). In this embodiment, a polarization direction of the display light that has passed through the display 120 has a polarization angle $\theta_{LCD}$=0°, 30°, 45°, 135°, and 150°, for example, when a longitudinal axis 121 of the display 120 is set to 0°. The polarization angle $\theta_{LCD}$ is a counterclockwise angle defined between the longitudinal axis 121 of the display 120 and the polarization direction of the display light emitted from the display 120.

The reflector 130 has a reflective surface forming a planar mirror and is disposed in the casing 101. The reflective surface of the reflector 130 is disposed to face the concave mirror 140. In the following description, a reflectance of the reflector 130 is represented by Rf (hereinafter referred to as "reflectance Rf").

The concave mirror 140 is configured to enlarge the reflected image from the reflector 130, and arranged to face the projection position 20a of the windshield. The concave mirror 140 reflects the display light emitted from the display 120 and reflected on the reflector 130. An opening 100a is defined in an upper surface of the casing 101, and the dust-proof cover 150 is disposed in the opening 100a. The display light reflected on the concave mirror 140 is projected onto the projection position 20a of the windshield 20 through the opening 100a (dust-proof cover 150). In other words, the concave mirror 140 forms a display light (display information) as a reflected image (virtual image) at a position opposite to the projection position 20a, and images the display light at the projection position 20a. In the following description, the reflectance of the concave mirror 140 is represented as Rc (hereinafter referred to as "reflectance Rc").

The dust-proof cover 150 is configured to close the opening 100a of the casing 101. The dust-proof cover 150 is formed of a sheet member made of resin. The dust-proof cover 150 has a permeability for transmitting therethrough the display light emitted from the display 120, and an optical-rotation property for changing the polarization direction of the display light passing through the dust-proof cover 150. The dust-proof cover 150 according to this embodiment is made of transparent polycarbonate or acrylic. The dust-proof cover 150 is formed to be curved downwardly, and closes the opening 100a. Hence, the dust-proof cover 150 is disposed at a position where the dust-proof cover 150 is hardly seen from the driver 400 sitting on the driver's seat.

The plate member forming the dust-proof cover 150 is formed by rolling during a manufacturing process. Hence, the dust-proof cover 150 has a refractive index $n_o$ along a rolling direction and a refractive index $n_e$ along a direction orthogonal to the rolling direction, which are different in value from each other. With the above configuration, the dust-proof cover 150 has the light-rotation property. In the following description, a transmittance for transmitting the s-polarized light of the dust-proof cover 150 is represented by Ts (hereinafter referred to as "s-polarized light transmittance Ts"), and a transmittance for transmitting the p-polarized light is represented by Tp (hereinafter referred to as "p-polarized light transmittance Tp").

The controller not shown controls the display information of the display 120. When an ignition switch of the vehicle turns on, the controller receives an electric power from a battery, and starts operating. The controller includes an operation switch, a microcomputer, a group of various sensors, and a driver circuit.

The HUD 100 configured as described above starts operating when receiving an input generated when, e.g., the driver 400 turns on the operation switch. The microcomputer of the controller determines the display information to be displayed on the basis of an instruction by the driver 400 through another in-vehicle ECU, and also forms the display information on the display 120 through the driver circuit.

As illustrated in FIG. 1, the display 120 emits, as the display light, the display information from the light emitted by the light emitting element 110, toward the reflector 130. The display light reflected by the reflector 130 is emitted onto the concave mirror 140. The concave mirror 140 emits the display light emitted from the display 120 onto the projection position 20a of the windshield 20 through the opening 100a and the dust-proof cover 150. The display light (display information) reflected on the projection position 20a is imaged as the display image 160 (virtual image) on a vehicle front extension line (front of a visual field of the driver 400) of a line between the driver 400 and the projection position 20a, and visually recognized by the driver 400.

Subsequently, a mechanism in which the driver 400 visually recognizes the virtual image will be described.

The display light reflected by the reflector 130 is reflected on the windshield 20 by the concave mirror 140. For that reason, when looking into the opening 100a, a display virtual image 120a which is a virtual image of the display 120 is reflected on the concave mirror 140. In the description, the light emitting element 110 corresponding to the display virtual image 120a reflected on the concave mirror 140 is referred to as "light emitting element virtual image 110a". The display virtual image 120a is obtained by allowing the display 120 to be reflected on the reflector 130, and allowing the virtual image of the display 120 reflected by the reflector 130 to be further reflected on the concave mirror 140.

A line between a first point in a first end side of the display virtual image 120a in a longitudinal direction of the display virtual image 120a and a second point, which is at the same height as the first point, in a second end side opposite to the first end side is defined as a virtual image longitudinal axis 121a of the display virtual image 120a. An angle defined between the polarization direction of the display light emitted by the display virtual image 120a and the virtual image longitudinal axis 121a is $\theta_{LCD}$ as described above. The angle $\theta_{LCD}$ is equal to an angle defined between the longitudinal axis of the display 120 and the polarization direction of the display light emitted by the display 120.

The display light reflected on the concave mirror 140 passes through the opening 100a and the dust-proof cover 150. In this case, an angle defined between the virtual image longitudinal axis 121a and the dust-proof cover 150 is defined as a cover mounting angle α.

Figure 2:
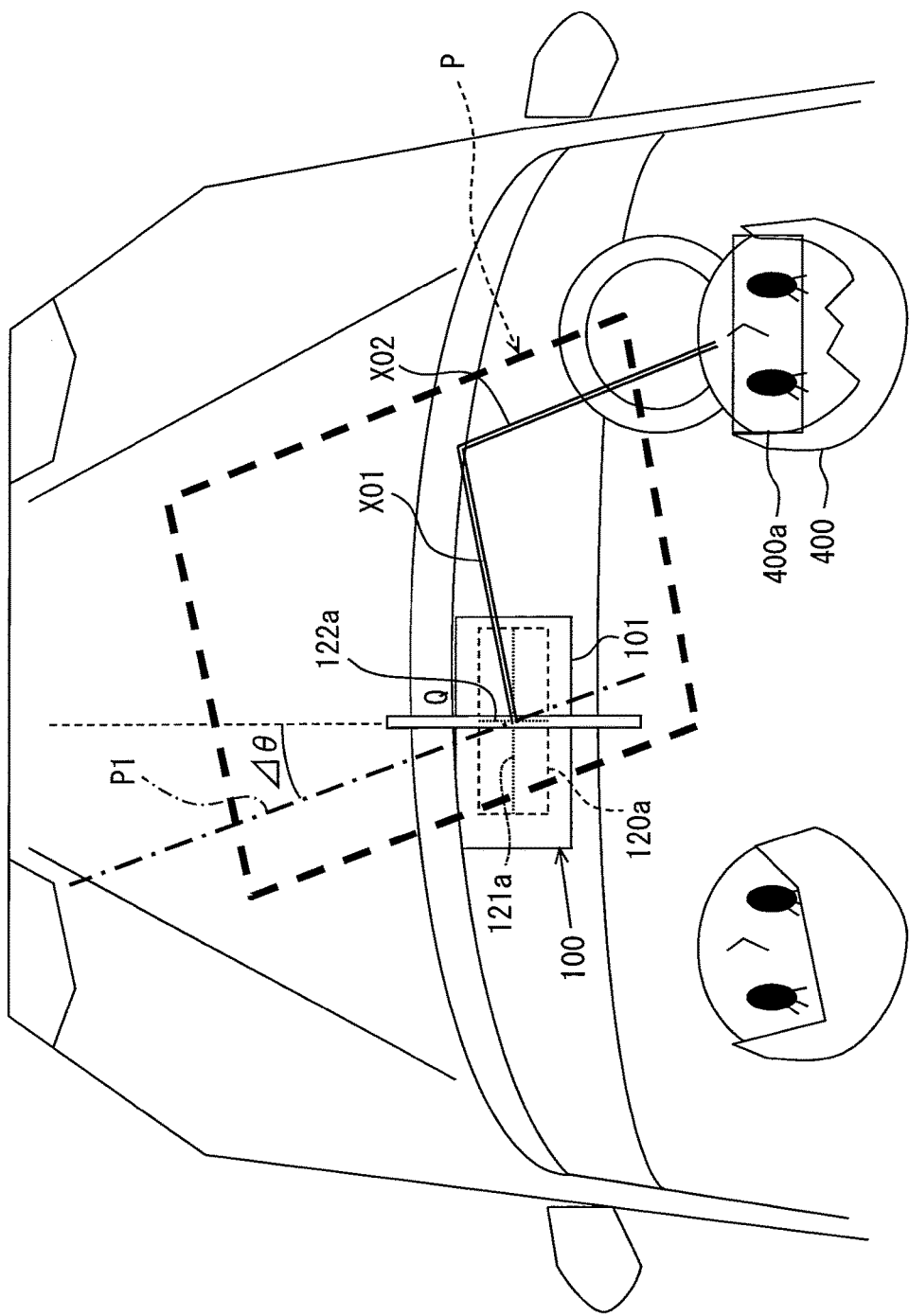
FIG. 2 is a top view illustrating a portion of the vehicle head-up display device according to the first embodiment.

The display light that has passed through the dust-proof cover 150 is reflected by the windshield 20. The reflected light travels toward the driver 400. Here, a virtual plane P including the respective light lines of an incident light (X01 indicated in FIG. 2) incident to the projection position 20a and a reflected light (X02 indicated in FIG. 2) reflected on the driver 400 from the projection position 20a is assumed, and a virtual plane Q orthogonal to the virtual image longitudinal axis 121a is assumed. As illustrated in FIG. 2, since the windshield 20 has the curvature in the horizontal direction, the virtual plane P is inclined with respect to the virtual plane Q. An angle between an intersection line P1 of the virtual plane P and the display virtual image 120a, and a lateral axis 122a of the display virtual image 120a is defined as a value of the mounting angle Δθ. That is, an angle between the virtual plane P and the virtual plane Q is defined as the value of the mounting angle Δθ. Further, the angle Δθ when the HUD 100 is mounted on a right-hand drive vehicle is assumed to a negative value, whereas a value of Δθ when the HUD 100 is mounted on a left-hand drive vehicle is assumed to a positive value. The mounting angle Δθ is different depending on the vehicles, and an absolute value of the mounting angle Δθ is an angle of about 3 to 10°.

The defined angle Δθ is an angle facing toward a longitudinal direction of the vehicle in cross-sections of the virtual plane P and the virtual plane Q in the horizontal direction.

Eventually, the display image 160 of the display information is imaged on the vehicle front extension line of a line between the eye box 400a close to the driver 400 and the projection position 20a, and as a result, the display image 160 is visually recognized as a virtual image by the driver 400.

Subsequently, a description will be given of a mechanism in which the light emitted from the light emitting element virtual image 110a is polarized before virtually recognized by the driver 400, with reference to FIGS. 1 and 3.

First, the state will be described with reference to FIG. 1. A position A indicates a polarization direction of the display light immediately after being emitted from the light emitting element virtual image 110a. A position B indicates the polarization direction of the display light immediately after the display light has been reflected by the concave mirror 140. A position C indicates a polarization direction of the display light immediately after the display light has passed through the dust-proof cover 150. A position D indicates the polarization direction of the display light immediately after the display light has been reflected on the windshield 20.

Figure 3:
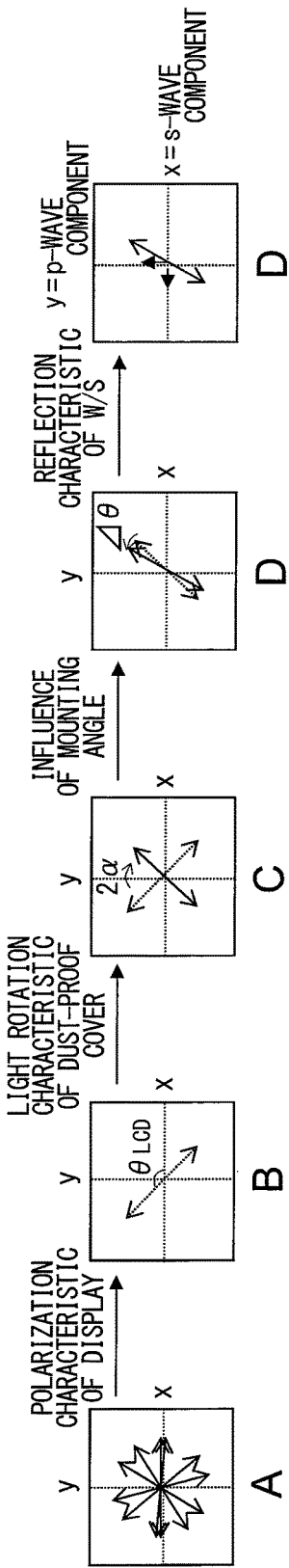
FIG. 3 is a diagram illustrating a state in which a display light is polarized in the first embodiment.

FIG. 3 illustrates a state in which the display light is polarized. At the positions A to C, it is assumed that a longitudinal axis of the light emitting element virtual image 110a is an x-axis, and an axis intersecting perpendicularly with both of the direction of gravity and the x-axis is a y-axis. At the position D, it is assumed that a width direction of a face of the driver 400 is an x-axis, and a longitudinal direction of the face is the y-axis.

First, the position A will be described. At the position A, the light immediately after being emitted from the light emitting element 110 has polarization components in various directions.

Next, the position B will be described. In the display light at the position B, a polarization component with an angle $\theta_{LCD}$ with respect to the x-axis is more intense than other polarization components. In other words, the display 120 extracts a component in the direction having the angle $\theta_{LCD}$ with respect to the longitudinal axis 121.

Next, the position C will be described. The polarization direction of the display light that has passed through the dust-proof cover 150 has an angle $\theta_{LCD}-2\alpha$ with respect to the X-axis. For that reason, the dust-proof cover 150 changes the polarization direction of the display light due to the cover mounting angle $\alpha$ with respect to the virtual image longitudinal axis 121a.

A value of the angle at which the display light is polarized when the display light passes through the dust-proof cover 150 changes depending on a temperature of the dust-proof cover 150. In a range of the temperature from −30° to 80° which is an automotive environment, the polarization direction of the display light is polarized by about $2\alpha$ with respect to the cover mounting angle $\alpha$.

Next, the display light at the position D will be described. The polarization direction of the display light at the position D is inclined by $\theta_{LCD}-2\alpha+\Delta\theta$ with respect to the x-axis. In other words, the polarization component is inclined by the angle $\Delta\theta$ defined between the virtual plane Q and the virtual plane P.

At the position D, an orientation of the p-polarized light component of the light reflected by the windshield is in parallel to the y-axis, and an orientation of the s-polarized light component is in parallel to the x-axis. For that reason, a magnitude of the p-polarized light component and a magnitude of the s-polarized light component in the display light change due to the angle $\theta_{LCD}-2\alpha+\Delta\theta$ defined with respect to the x-axis at the position D.

As described above, the polarization direction is determined according to the angle $\theta_{LCD}$, the cover mounting angle $\alpha$, and the angle $\Delta\theta$. The angles $\theta_{LCD}$ and $\Delta\theta$ are determined by a vehicle model or the display 120. On the contrary, the cover mounting angle $\alpha$ can be adjusted at the time of designing the dust-proof cover 150. In other words, the cover mounting angle $\alpha$ is designed according to a required luminance characteristic with the results that an intensity ratio of the s-polarized light and the p-polarized light of the virtual image visually recognized by the driver 400 can be set.

In this example, in general, the incident angle $\theta i$ and the reflected angle $\theta r$ with respect to the windshield 20 of the display light are about 50 to 68°. For example, when the reflected angle is 65°, the reflectance Rs of the s-polarized light is 37.3%, and the reflectance Rp of the p-polarized light is 2.4%. The reflectance Rs of the s-polarized light is overwhelmingly higher than the reflectance Rp of the p-polarized light.

From the above viewpoints, in order to ensure a sufficient luminance suiting the case of the naked eyes, and the case in which the polarized sunglasses are worn, when a large amount of current is applied to the light emitting element 110, a sum of the luminance of the s-polarized light component and the luminance of the p-polarized light component viewed by the naked eyes may have an excess luminance, and the efficiency is deteriorated.

Under the circumstances, in the HUD 100 according to this embodiment, by selecting material of the dust-proof cover 150 (polycarbonate or acrylic), setting constants $A_1$ and $A_2$ specific to the dust-proof cover 150, and adjusting the cover mounting angle $\alpha$, a ratio of the s-polarized light and the p-polarized light of the display image luminance I can be adjusted.

The present inventors newly derive the luminance I in the naked eyes from the following Expression 1.

$$I = (I_0 \cdot T_{TFT} \cdot R) \times [Rs \cdot \{A_1 \cos^2(\theta_{LCD}+\Delta\theta-2\alpha)+A_2 \cos^2(\theta_{LCD}+\Delta\theta)\} + Rp \cdot \{A_1 \sin^2(\theta_{LCD}+\Delta\theta-2\alpha)+A_2 \sin^2(\theta_{LCD}+\Delta\theta)\}] \quad \text{[Expression 1]}$$

where $I_0$ is a luminance of the light emitting element 110, $T_{TFT}$ is a transmittance of the display 120, R is a reflectance (=reflectance Rf×reflectance Rc) of the reflector 130 and the concave mirror 140, Rs is a reflectance of the s-polarized light in the windshield 20, Rp is a reflectance of the p-polarized light in the windshield 20, $\theta_{LCD}$ is a polarization angle between the display light and the longitudinal axis 121, $\Delta\theta$ is an angle defined by the virtual plane P and the virtual plane P, $\alpha$ is an angle (hereinafter referred to as "cover mounting angle $\alpha$") defined by a rolling direction at the time of forming the dust-proof cover 150 and the virtual image longitudinal axis 121a, and $A_1$ and $A_2$ are constants determined according to a material of the dust-proof cover 150 and a rolling condition.

The above Expression 1 is derived from the following Expression 2.

$$I = I_0 \cdot T_{TFT} \cdot R \cdot (Rs \cdot Ts + Rp \cdot Tp) \quad \text{[Equation 2]}$$

where

Ts is an s-polarized light transmittance of the dust-proof cover 150, and

Tp is a p-polarized light transmittance of the dust-proof cover 150.

The luminance $I_p$ of the p-polarized light component can be represented by the following Expression 3.

$$I_p = I_0 \cdot T_{TFT} \cdot R \times Rp \cdot \{A_1 \sin^2(\theta_{LCD} + \Delta\theta - 2\alpha) + A_2 \sin^2(\theta_{LCD} + \Delta\theta)\}$$  [Equation 3]

The s-polarized light reflectance Rs, the p-polarized light reflectance Rp, and the mounting angle $\Delta\theta$ in the above Expression 1 are determined for each of the vehicle models. The reflectance Rs is larger than the reflectance Rp. For example, in the following description, the s-polarized light reflectance Rs=37.3%, the p-polarized light reflectance Rp=2.4%, and the mounting angle $\Delta\theta=5°$. The constants $A_1$ and $A_2$ are set as the constant $A_1=0.50$ and the constant $A_2=0.59$, which were obtained through experiments. Available ranges of the constants $A_1$ and $A_2$ are set as $0.3 \leq$ constant $A_1 \leq 0.5$, and $0.39 \leq$ constant $A_2 \leq 0.59$.

In the present disclosure, there is no need to provide a retardation plate, separately, resulting in no increase in the number of parts and the body size.

Next, a description will be given of a specific example of a method for selecting the cover mounting angle $\alpha$ so that the virtual image can be visually recognized with an appropriate luminance I in both of the case where the driver 400 has naked eyes, and the case where the driver 400 wears polarized sunglasses, with reference to FIGS. 4 to 9.

FIGS. 4 to 9 are graphs showing the luminance I of s-polarized light+p-polarized light, and the luminance $I_p$ of only the p-polarized light in a right-hand drive vehicle and a left-hand drive vehicle at an arbitrary $\theta_{LCD}$ when the constants $A_1$ (=0.5) and $A_2$ (0.39) and the respective specified terms are assigned in Expression 1.

In this example, the luminance I of s-polarized light+p-polarized light, and the luminance $I_p$ of the p-polarized light are periodically changed on the basis of the angle $\theta_{LCD}$, the angle $\Delta\theta$, and the cover mounting angle $\alpha$.

The luminance I of s-polarized light+p-polarized light, and the luminance $I_p$ of the p-polarized light have a phase difference of 90°. For that reason, when the cover mounting angle $\alpha$ is selected so that the luminance I of s-polarized light+p-polarized light has a maximum value, the luminance $I_p$ of only the p-polarized light has a minimum value.

Therefore, when the cover mounting angle $\alpha$ is selected so that the luminance I of s-polarized light+p-polarized light is at an arbitrary rate with respect to the maximum value, the luminance $I_p$ of the p-polarized light is resultantly greater than the minimum. In other words, by changing the cover mounting angle $\alpha$, both of the luminance I of s-polarized light+p-polarized light and the luminance $I_p$ of the p-polarized light can be adjusted to has relatively high values.

In a first embodiment, the cover mounting angle $\alpha$ is selected so that the luminance I falls within a range of from 65% to 90% of the maximum value. With such a selection, the driver 400 can visually recognize the sufficient luminance when viewing the display image 160 by his naked eyes, and the driver 400 can visually recognize the display image 160 with a permissible luminance even when viewing the display image 160 through polarized glasses.

Specifically, as illustrated in FIGS. 4 to 8, the range of $\alpha$ when the luminance I ranges from 65% to 90% is different depending on a value of $\theta_{LCD}$. In FIGS. 4 to 8, $I_0=120000$ cd/m², $T_{TFT}=0.5$, R=0.5, Rs=0.373, Rp=0.024, $A_1=0.5$, $A_2=0.39$, and $\Delta\theta=\pm 5$ are met. In the graphs, a range ($\alpha$LHD) between two solid lines disposed in parallel to the axis of ordinate is an example of the range in which the cover mounting angle $\alpha$ is selected in an LHD. In the graphs, a range ($\alpha$RHD) between two dashed lines disposed in parallel to the axis of ordinate is an example of the range in which the cover mounting angle $\alpha$ is selected in an RHD. The LHD means a case in which the HUD 100 is mounted in the left-hand drive vehicle, and $\Delta\theta$ at that time is 5°. The RHD means a case in which the HUD 100 is mounted in the right-hand drive vehicle, and $\Delta\theta$ at that time is $-5°$.

Figure 4:
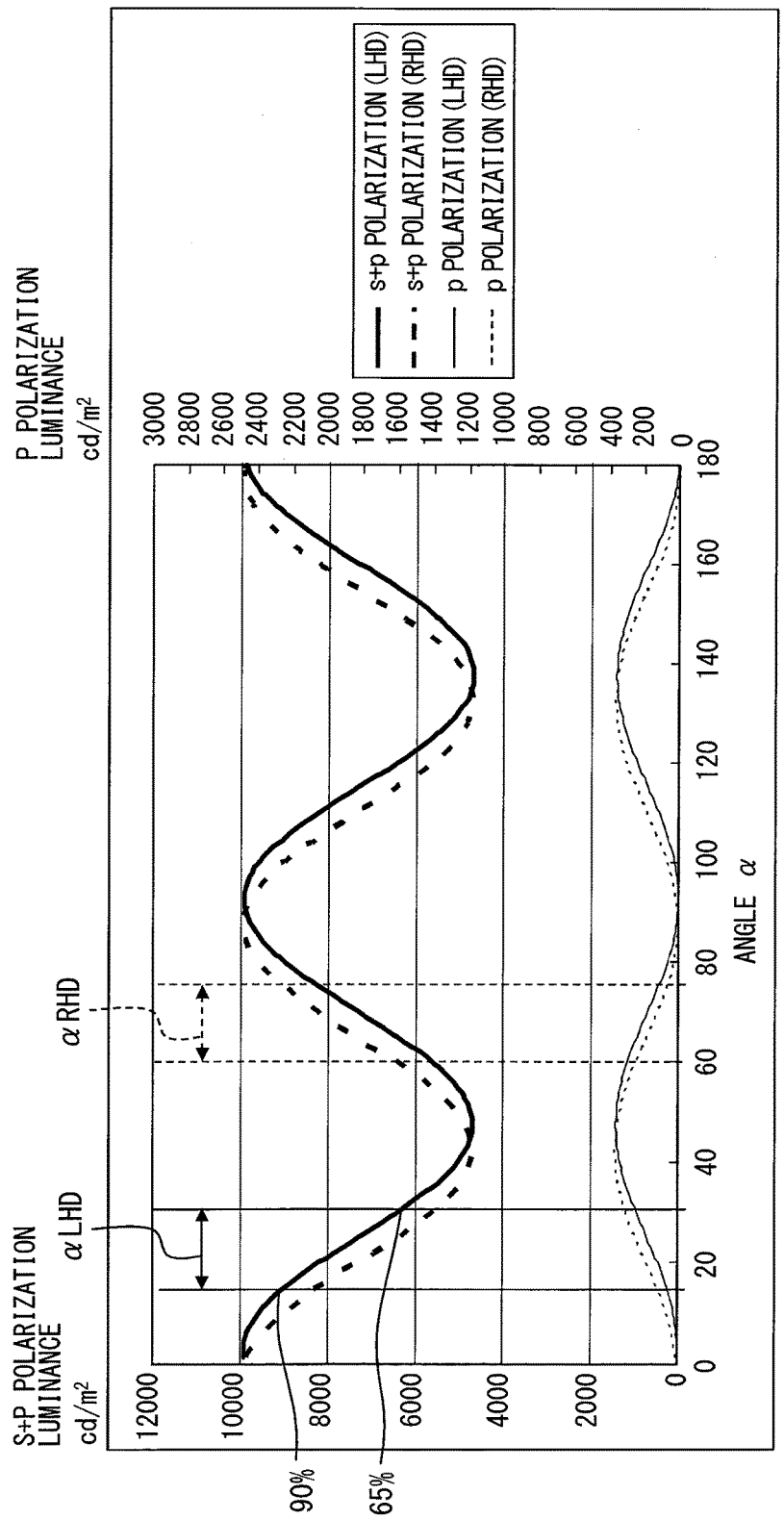
FIG. 4 is a diagram illustrating a setting example of a cover mounting angle α at an angle $\theta_{LCD}$=0° in the first embodiment.

The graph of FIG. 4 shows a relationship of the cover mounting angle $\alpha$, the luminance I of s-polarized light+p-polarized light in the RHD, the luminance $I_p$ of the p-polarized light in the RHD, the luminance I of s-polarized light+p-polarized light in the LHD, and the luminance $I_p$ of the p-polarized light in the LHD, at the $\theta_{LCD}=0°$.

Referring to FIG. 4, in both of the LHD and the RHD, the maximum value of the luminance I of the display image 160 is about 10,000 cd/m². For that reason, the cover mounting angle $\alpha$ is selected so that the luminance I of the display image 160 ranges from 6500 cd/m² which is 65% of the maximum value 10,000 cd/m² to 9,000 cd/m² which is 90% of the maximum value 10,000 cd/m². In the case of the LHD, $\alpha=16°$ to $30°\pm n\pi/2$ (n=0, 1 ...) or $\alpha=65°$ to $79°\pm n\pi/2$ (n=0, 1 ...). In this situation, the luminance $I_p$ ranges from about 76 cd/m² to about 240 cd/m². In the case of the RHD, $\alpha=11°$ to $25°\pm n\pi/2$ (n=0, 1 ...) or $\alpha=60°$ to $74°\pm n\pi/2$ (n=0, 1 ...). In this situation, the luminance $I_p$ ranges from about 76 cd/m² to about 240 cd/m².

Figure 5:
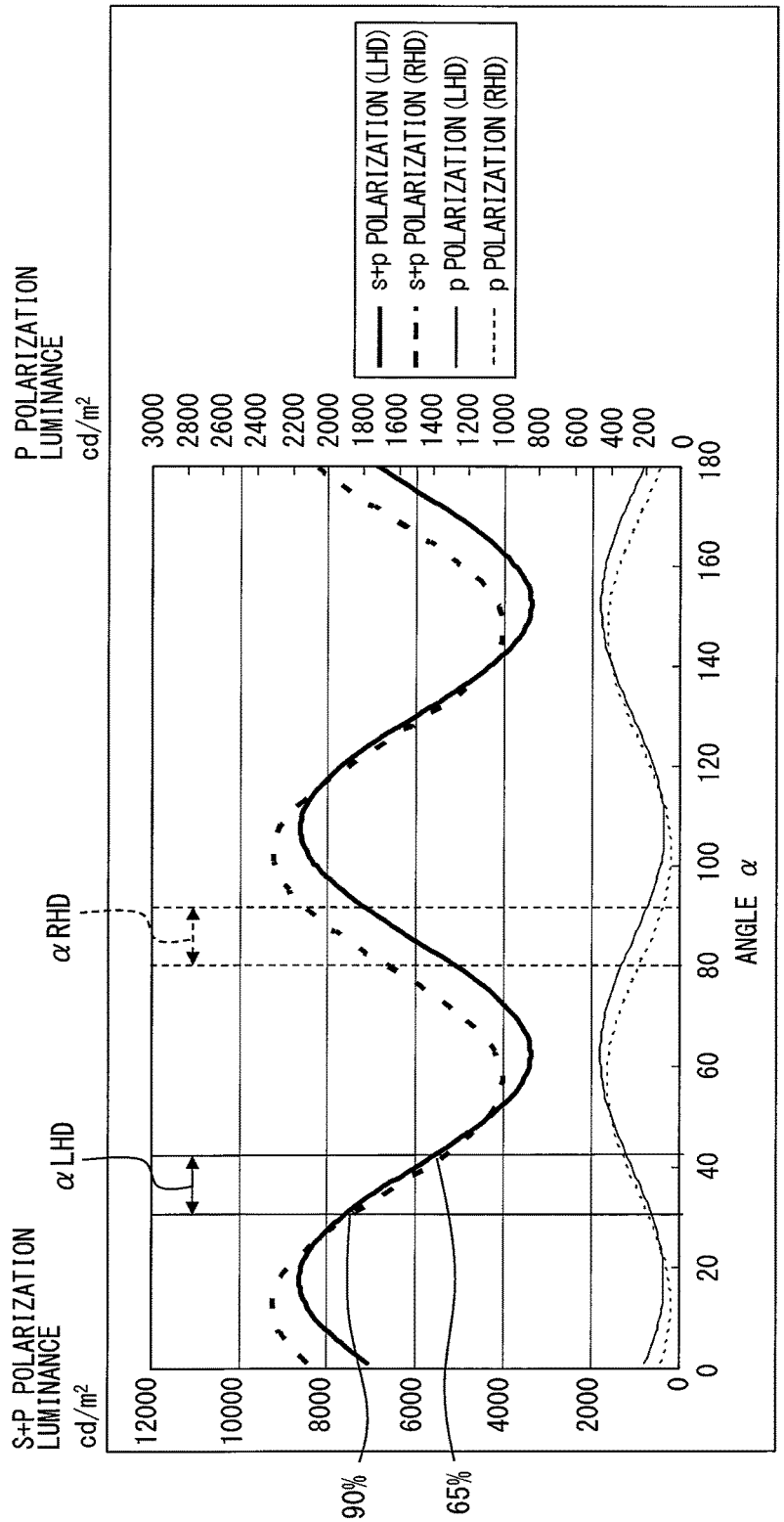
FIG. 5 is a diagram illustrating a setting example of the cover mounting angle α at the angle $\theta_{LCD}$=30° in the first embodiment.

The graph of FIG. 5 shows a relationship of the cover mounting angle $\alpha$, and the luminance I of s-polarized light+p-polarized light in the RHD at $\theta_{LCD}=30°$ and $\Delta\theta=-5°$. The graph of FIG. 5 also shows a relationship of the cover mounting angle $\alpha$ and the luminance $I_p$ of the p-polarized light in the RHD. The graph of FIG. 5 further shows a relationship of the cover mounting angle $\alpha$ and the luminance I of s-polarized light+p-polarized light in the LHD at $\theta_{LCD}=30°$ and $\Delta\theta=5°$. The graph of FIG. 5 further shows a relationship of the cover mounting angle $\alpha$ and the luminance $I_p$ of the p-polarized light in the LHD.

In the LHD of FIG. 5, the maximum value of the luminance I of the display image 160 is about 8,600 cd/m². For that reason, the cover mounting angle $\alpha$ is selected so that the luminance I of the display image 160 ranges from 5,600 cd/m² which is 65% of the maximum value 8,600 cd/m² to 7,700 cd/m² which is 90% of the maximum value 8,600 cd/m². In that case, $\alpha=30°$ to $42°\pm n\pi/2$ (n=0, 1 ...) or $\alpha=83°$ to $95°\pm n\pi/2$ (n=0, 1 ...) is met. In this situation, the luminance $I_p$ ranges from about 150 cd/m² to about 300 cd/m².

In the RHD of FIG. 5, the maximum value of the luminance I of the display image 160 is about 9,200 cd/m². For that reason, the cover mounting angle $\alpha$ is selected so that the luminance I of the display image 160 ranges from about 6,000 cd/m² which is 65% of the maximum value 9,200 cd/m² to about 8,300 cd/m² which is 90% of the maximum value 9,200 cd/m². In that case, $\alpha=25°$ to $38°\pm n\pi/2$ (n=0, 1 ...) or $\alpha=77°$ to $90°\pm n\pi/2$ (n=0, 1 ...) is met. In this situation, the luminance $I_p$ ranges from about 110 cd/m² to about 270 cd/m².

Figure 6:
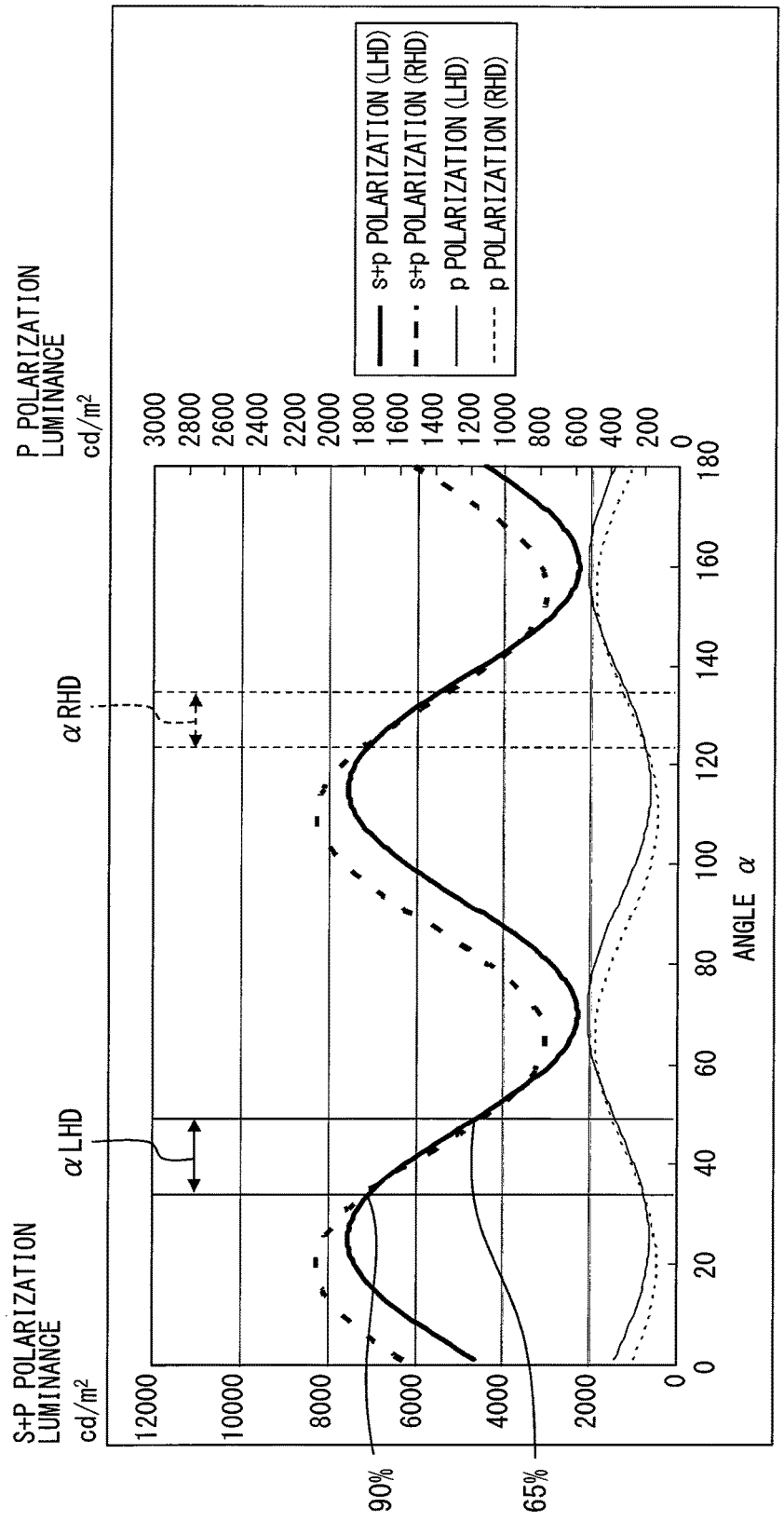
FIG. 6 is a diagram illustrating a setting example of the cover mounting angle α at the angle $\theta_{LCD}$=45° in the first embodiment.

The graph of FIG. 6 shows a relationship of the cover mounting angle $\alpha$, the luminance I of s-polarized light+p-polarized light in the RHD, the luminance $I_p$ of the p-polarized light in the RHD, the luminance I of s-polarized light+p-polarized light in the LHD, and the luminance $I_p$ of the p-polarized light in the LHD, at the $\theta_{LCD}=45°$.

In the LHD of FIG. 6, the maximum value of the luminance I of the display image 160 is about 7,600 cd/m². For that reason, the cover mounting angle $\alpha$ is selected so that the luminance I of the display image 160 ranges from about 5,000 cd/m² which is 65% of the maximum value 7,600 cd/m² to about 6,800 cd/m² which is 90% of the maximum value 7,600 cd/m². In that case, $\alpha=3°$ to $14°\pm n\pi/2$ (n=0, 1 . . . ) or $\alpha=36°$ to $47°\pm n\pi/2$ (n=0, 1 . . . ) is met. In this situation, the luminance $I_p$ ranges from about 210 cd/m² to about 340 cd/m².

In the RHD of FIG. 6, the maximum value of the luminance I of the display image 160 is about 8,300 cd/m². For that reason, the cover mounting angle $\alpha$ is selected so that the luminance I of the display image 160 ranges from about 5,400 cd/m² which is 65% of the maximum value 8,300 cd/m² to about 7,500 cd/m² which is 90% of the maximum value 8,300 cd/m². In that case, $\alpha=32°$ to $44°\pm n\pi/2$ (n=0, 1 . . . ) or $\alpha=86°$ to $98°\pm n\pi/2$ (n=0, 1 . . . ) is met. In this situation, the luminance $I_p$ ranges from about 175 cd/m² to about 310 cd/m².

Figure 7:
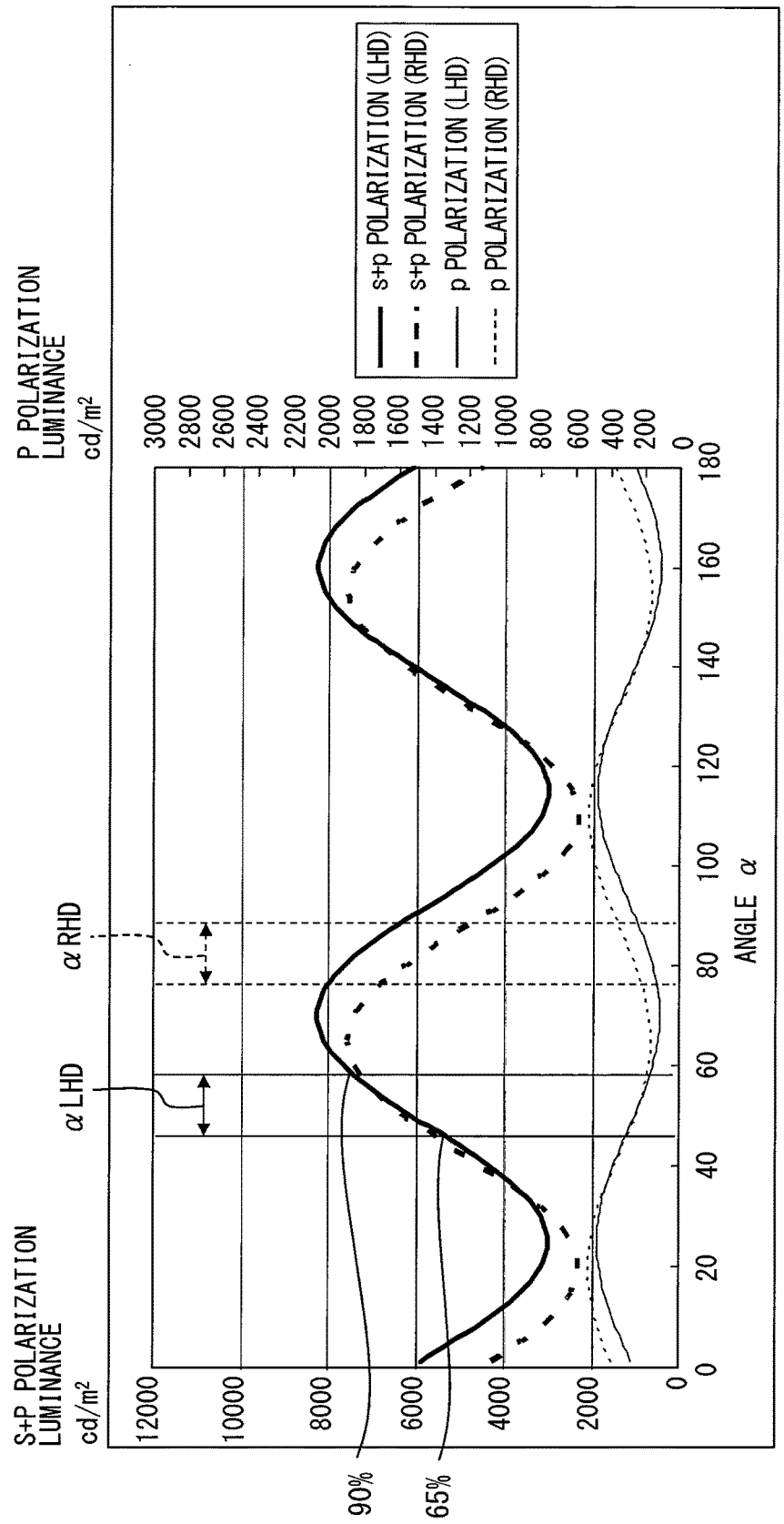
FIG. 7 is a diagram illustrating a setting example of the cover mounting angle α at the angle $\theta_{LCD}$=135° in the first embodiment.

The graph of FIG. 7 shows a relationship of the cover mounting angle $\alpha$, the luminance I of s-polarized light+p-polarized light in the RHD, the luminance $I_p$ of the p-polarized light in the RHD, the luminance I of s-polarized light+p-polarized light in the LHD, and the luminance $I_p$ of the p-polarized light in the LHD, at the $\theta_{LCD}=135°$.

In the LHD of FIG. 7, the maximum value of the luminance I of the display image 160 is about 8,300 cd/m². For that reason, the cover mounting angle $\alpha$ is selected so that the luminance I of the display image 160 ranges from about 5,400 cd/m² which is 65% of the maximum value 8,300 cd/m² to about 7,500 cd/m² which is 90% of the maximum value 8,300 cd/m². In that case, $\alpha=46°$ to $58°\pm n\pi/2$ (n=0, 1 . . . ) or $\alpha=82°$ to $94°\pm n\pi/2$ (n=0, 1 . . . ) is met. In this situation, the luminance $I_p$ ranges from about 175 cd/m² to about 315 cd/m².

In the RHD of FIG. 7, the maximum value of the luminance I of the display image 160 is about 7,600 cd/m². For that reason, the cover mounting angle $\alpha$ is selected so that the luminance I of the display image 160 ranges from about 5,000 cd/m² which is 65% of the maximum value 7,600 cd/m² to 6800 cd/m² which is 90% of the maximum value 7,600 cd/m². In that case, $\alpha=43°$ to $54°\pm n\pi/2$ (n=0, 1 . . . ) or $\alpha=76°$ to $87°\pm n\pi/2$ (n=0, 1 . . . ) is met. In this situation, the luminance $I_p$ ranges from about 210 cd/m² to about 340 cd/m².

Figure 8:
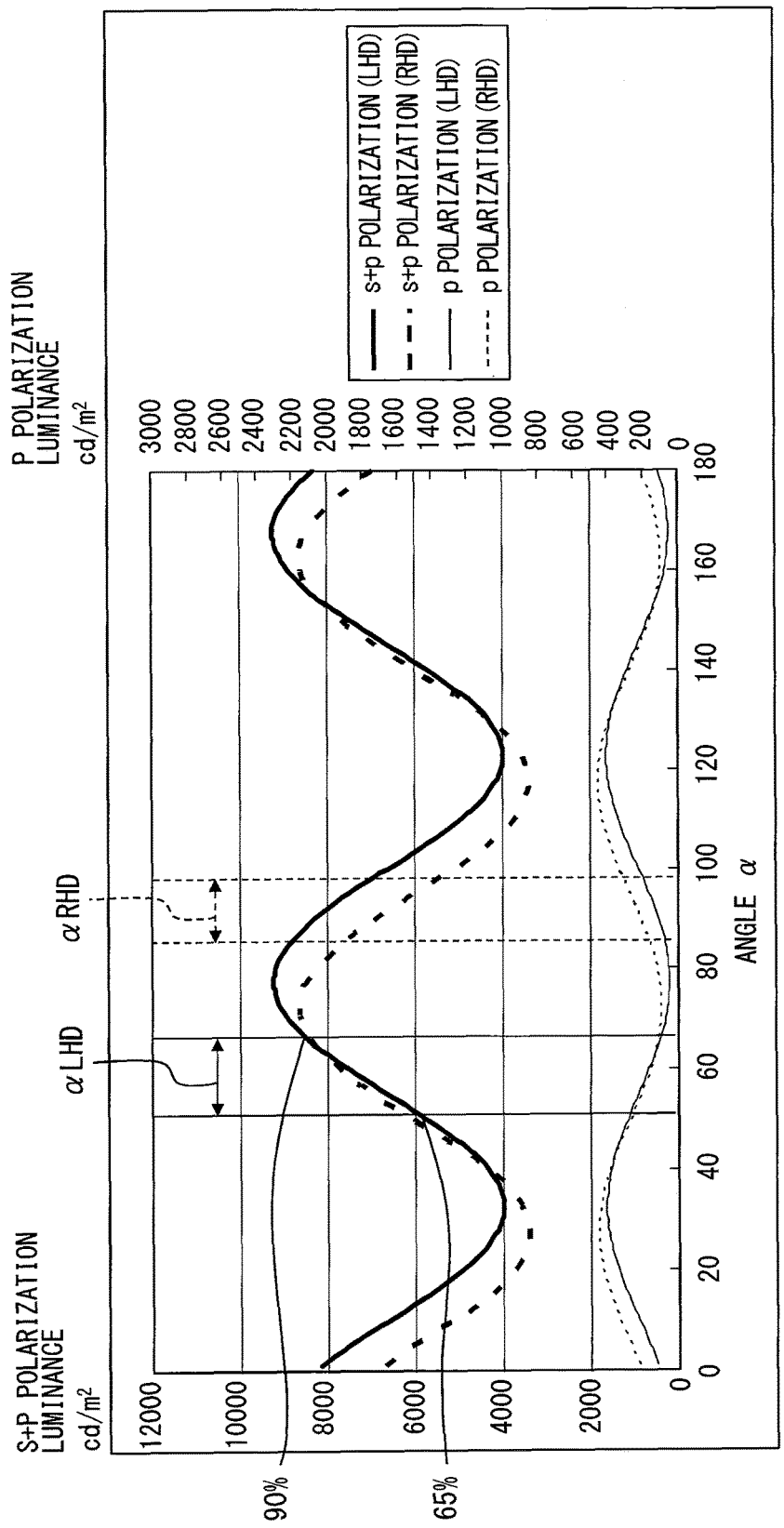
FIG. 8 is a diagram illustrating a setting example of the cover mounting angle α at the angle $\theta_{LCD}$=150° in the first embodiment.

The graph of FIG. 8 shows a relationship of the $\theta_{LCD}=150°$, the cover mounting angle $\alpha$, the luminance I of s-polarized light+p-polarized light in the RHD, the luminance $I_p$ of the p-polarized light in the RHD, the luminance I of s-polarized light+p-polarized light in the LHD, and the luminance $I_p$ of the p-polarized light in the LHD.

In the LHD of FIG. 8, the maximum value of the luminance I of the display image 160 is about 9,200 cd/m². For that reason, the cover mounting angle $\alpha$ is selected so that the luminance I of the display image 160 ranges from about 6,000 cd/m² which is 65% of the maximum value 9,200 cd/m² to about 8,300 cd/m² which is 90% of the maximum value 9,200 cd/m². In that case, $\alpha=0°$ to $13°\pm n\pi/2$ (n=0, 1 . . . ) or $\alpha=52°$ to $65°\pm n\pi/2$ (n=0, 1 . . . ) is met. In this situation, the luminance $I_p$ ranges from about 115 cd/m² to about 270 cd/m².

In the RHD of FIG. 8, the maximum value of the luminance I of the display image 160 is about 8,600 cd/m². For that reason, the cover mounting angle $\alpha$ is selected so that the luminance I of the display image 160 ranges from about 5,600 cd/m² which is 65% of the maximum value 8,600 cd/m² to about 7,700 cd/m² which is 90% of the maximum value 8,600 cd/m². In that case, $\alpha=48°$ to $60°\pm n\pi/2$ (n=0, 1 . . . ) or $\alpha=85°$ to $97°\pm n\pi/2$ (n=0, 1 . . . ) is met. In this situation, the luminance $I_p$ ranges from about 150 cd/m² to about 300 cd/m².

As described above, the luminance I of the display image 160 visually recognized by the driver 400 can be adjusted by adjusting the cover mounting angle $\alpha$ according to the $\theta_{LCD}$.

(Second Embodiment)

Figure 9:
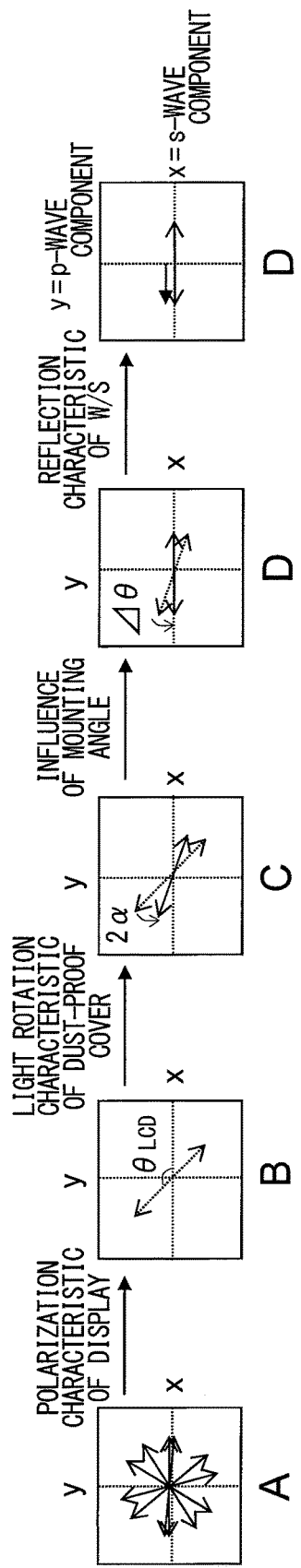
FIG. 9 is a diagram illustrating a state in which a display light is polarized in a second embodiment.

A method of selecting a cover mounting angle $\alpha$ according to a second embodiment will be described below. In the second embodiment, the cover mounting angle $\alpha$ is selected so that a luminance I of (S+P)-polarized light in a display image 160 has a maximum value. FIG. 9 shows a polarization direction of a display light according to the second embodiment.

In the second embodiment, the cover mounting angle $\alpha$ is selected so that the polarization direction of the display light at a position D is in parallel to an x-axis (a longitudinal axis of a virtual image of a display which is reflected on a reflector). In other words, the cover mounting angle $\alpha$ is selected so that an s-polarized light component becomes largest. As described above, a reflectance Rs of the s-polarized light is larger than a reflectance Rp of a p-polarized light. For that reason, the luminance I of the virtual image by the naked eyes becomes maximum.

Figure 10:
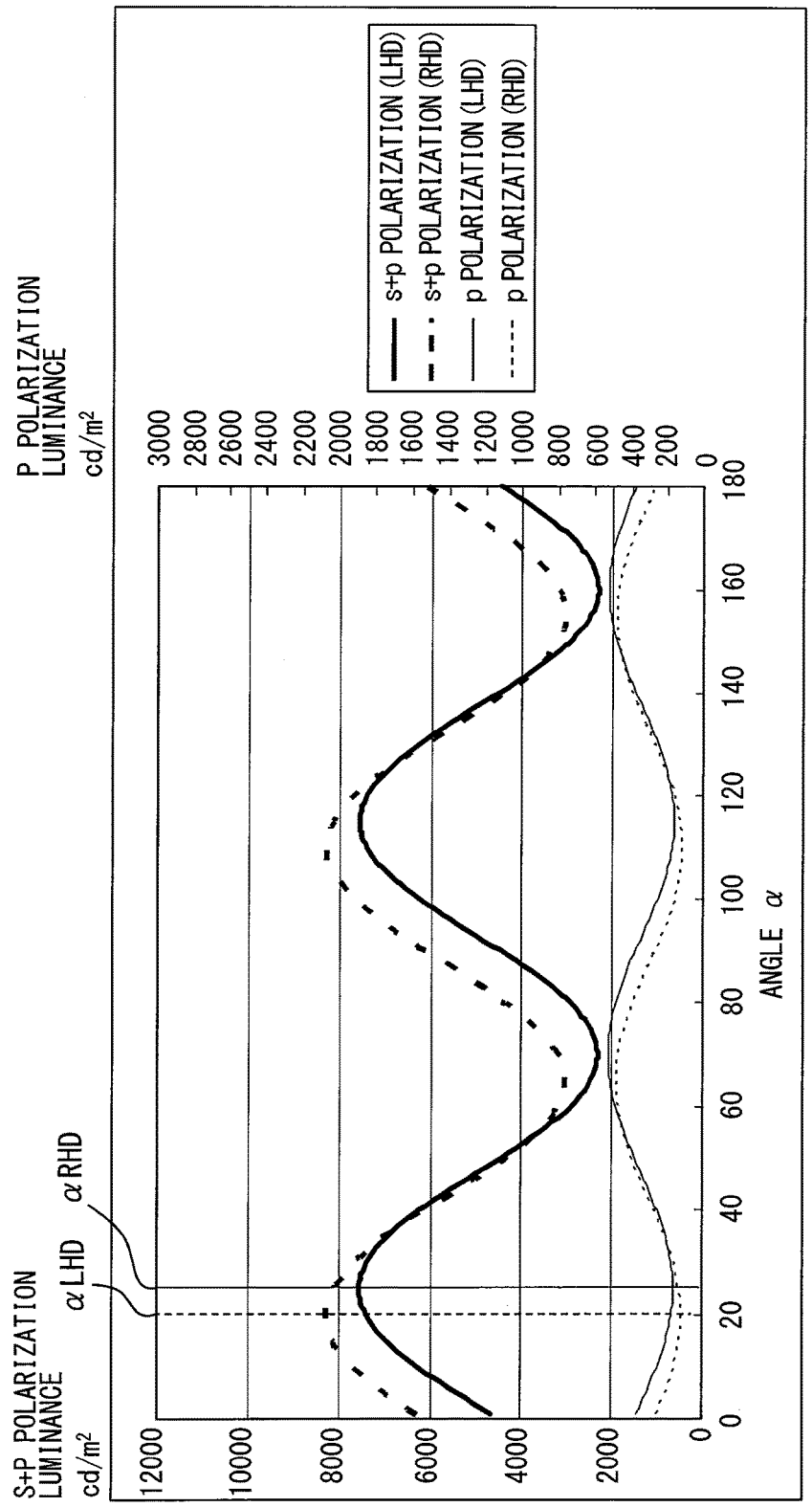
FIG. 10 is a diagram illustrating a setting example of the cover mounting angle α at an angle $\theta_{LCD}$=45° in a second embodiment.

FIG. 10 illustrates an example of the cover mounting angle $\alpha$ according to the second embodiment. It should be noted that $I_0=120000$ cd/m², $T_{TFT}=0.5$, R=0.5, Rs=0.373, Rp=0.024, $A_1=0.5$, $A_2=0.39$, and $\Delta\theta=\pm 5$.

The graph of FIG. 10 shows a relationship of the $\theta_{LCD}=45°$, the cover mounting angle $\alpha$, the luminance I of s-polarized light+p-polarized light in the RHD, the luminance $I_p$ of the p-polarized light in the RHD, the luminance I of s-polarized light+p-polarized light in the LHD, and the luminance $I_p$ of the p-polarized light in the LHD.

In the LHD, the maximum value of the luminance I of the display image 160 is about 7,600 cd/m². For that reason, the cover mounting angle $\alpha$ is selected so that a luminance I of the display image 160 has the maximum value 7600 cd/m². When $\alpha$ at which the luminance I is maximum is $\alpha_{max(LHD)}$, $\alpha_{max(LHD)}=25°\pm n\pi/2$ (n=0, 1 . . . ) is selected.

In the RHD, the maximum value of the luminance I of the display image 160 is about 8,300 cd/m². For that reason, the cover mounting angle $\alpha$ is selected so that a luminance I of the display image 160 has the maximum value 8,300 cd/m². In that case, $\alpha_{max(LHD)}=20°\pm n\pi/2$ (n=0, 1 . . . ) is selected.

Likewise, $\alpha_{max(LHD)}=93°\pm n\pi/2$ (n=0, 1 . . . ) and $\alpha_{max(RHD)}=88°\pm n\pi/2$ (n=0, 1 . . . ) are met at $\theta_{LCD}=0°$.

Also, $\alpha_{max(LHD)}=108°\pm n\pi/2$ (n=0, 1 . . . ) and $\alpha_{max(RHD)}=103°\pm n\pi/2$ (n=0, 1 . . . ) are met at $\theta_{LCD}=30°$.

Also, $\alpha_{max(LHD)}=70°\pm n\pi/2$ (n=0, 1 . . . ) and $\alpha_{max(RHD)}=65°\pm n\pi/2$ (n=0, 1 . . . ) are met at $\theta_{LCD}=135°$.

Also, $\alpha_{max(LHD)}=78°\pm n\pi/2$ (n=0, 1 . . . ) and $\alpha_{max(RHD)}=73°\pm n\pi/2$ (n=0, 1 . . . ) are met at $\theta_{LCD}=150°$.

As described above, the luminance I of the display image 160 can be set to a maximum value by selecting $\alpha$ according to $\theta_{LCD}$.

(Third Embodiment)

Figure 11:
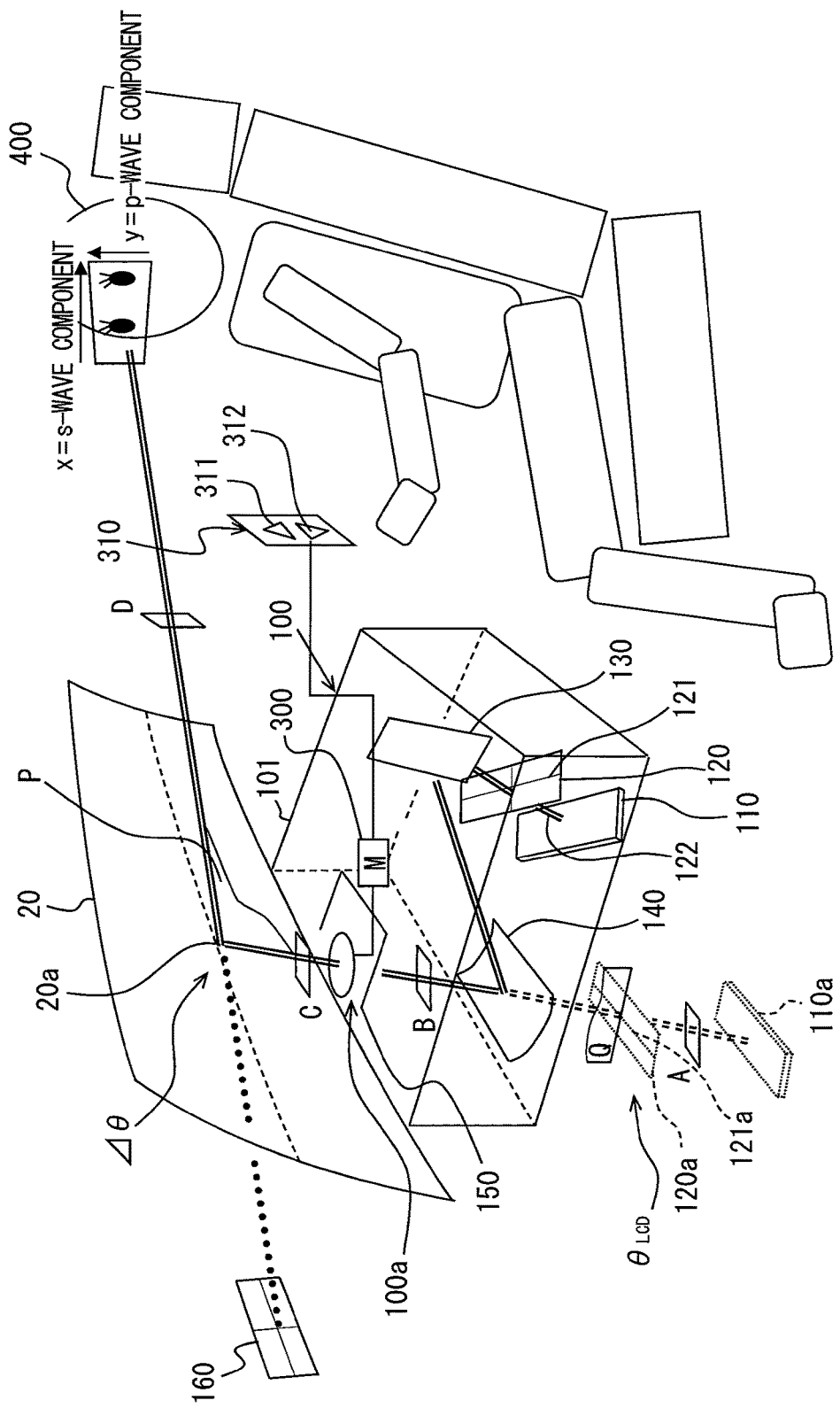
FIG. 11 is a schematic configuration diagram of a vehicle head-up display device according to a third embodiment.

In a third embodiment, as illustrated in FIG. 11, a motor 300 is further disposed in a casing. The motor 300 is connected to a dust-proof cover 150. The motor 300 is connected to a cover operation remote controller 310.

With the above configuration, the dust-proof cover 150 rotates according to the rotation of the motor 300. Because an angle between a rolling direction of the dust-proof cover 150 and a virtual image longitudinal axis 121a changes, a cover mounting angle $\alpha$ changes. Therefore, a driver 400 can increase or decrease a luminance I of a display image 160 and a luminance $I_p$ of a p-polarized light component of the display image 160 according to his own preference.

The operation remote controller 310 is equipped with an up-switch 311 and a down-switch 312. When the up-switch 311 is depressed, the motor 300 rotates so that the dust-proof cover 150 rotates clockwise.

On the other hand, when the down-switch 312 is depressed, the motor 300 rotates so that the dust-proof cover 150 rotates counterclockwise.

(Other Embodiments)

Figure 12:
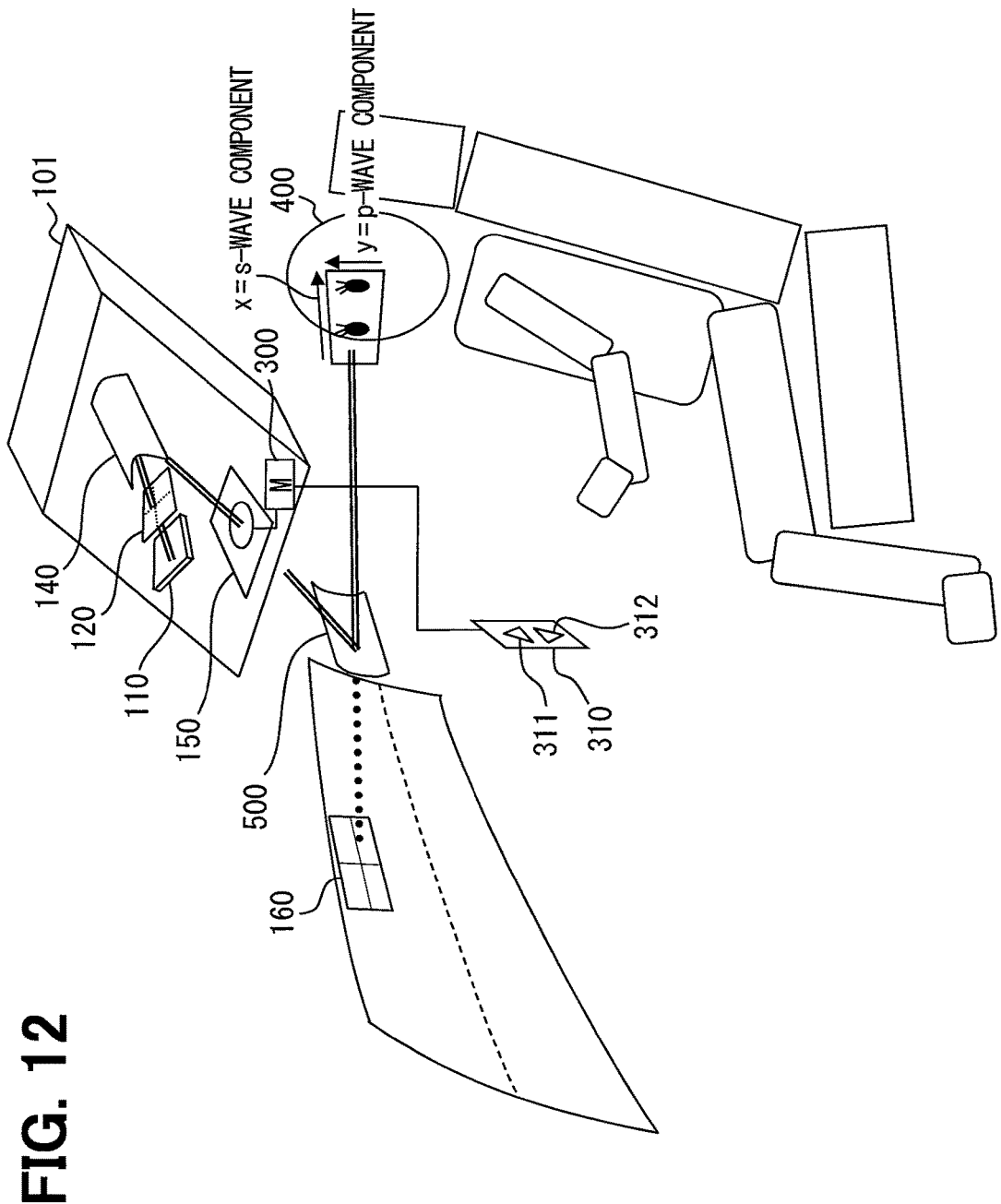
FIG. 12 is a schematic configuration diagram of a vehicle head-up display device according to a fourth embodiment.

In the above embodiments, the casing 101 is installed within the instrument panel of the vehicle, but the present disclosure is not limited to that configuration. As illustrated in FIG. 12, a light emitting element 110, a display 120, a concave mirror 140, and a dust-proof cover 150 may be disposed on an upper portion of a vehicle, and a virtual image may be imaged by being reflected on a combiner 500.

In the above embodiment, the display light is reflected on the windshield. However, the present disclosure is not limited to the above configuration, but the display light may be reflected on the combiner disposed separately from the windshield.

In the above description, the reflector 130 and the concave mirror 140 are used as the reflector. Alternatively, for example, the concave mirror 140 may be eliminated, and only the reflector 130 may be used so that the display light reflected from the reflector 130 may be emitted onto the projection position 20a. In that case, a reflectance R is expressed by only a reflectance Rf in Expression 1. Alternatively, the display light from the display 120 may be emitted directly onto the projection position 20a without the use of the reflector. In that case, the reflectance R is 1 in Expression 1.

In the above description, the display 120 is formed of a TFT liquid crystal panel, a dual scan display, or a TN segment liquid crystal. However, the display 120 is not limited to the above configuration, but may be formed of a self-light emitting display such as an electroluminescence. Further, the display 120 may be formed of a laser projector that scans with laser.

The cover mounting angle α is set so that the luminance I becomes 65% to 90% of the maximum of the luminance I. However, the cover mounting angle α is not limited to the above setting, and the cover mounting angle α may be selected so that the luminance I is not the maximum value and the minimum value. With the above selection, one of the luminance I and the luminance $I_p$ can be restrained from being extremely lowered.

What is claimed is:

1. A vehicle head-up display device, comprising:
a casing that is disposed close to a driver's seat of a vehicle and has an opening, the vehicle having a windshield or a combiner disposed separately from the windshield;
a light emitting element that is housed in the casing;
a display that is housed in the casing and emits a display light indicating display information upon receiving a light emitted by the light emitting element;
a reflector that is housed in the casing and reflects the display light; and
a dust-proof cover that is made of a resin sheet and is disposed in the opening, wherein
the display light transmitted through the dust-proof cover is reflected on the windshield or the combiner, whereby the display information is displayed as a virtual image to be visible from the driver's seat of the vehicle,
the dust-proof cover, which is formed by rolling the resin sheet in a rolling direction, has a light transmission property, the light transmission property of the dust-proof cover being defined by a first refractive index along the rolling direction and a second refractive index along a direction orthogonal to the rolling direction, the first refractive index being different from the second refractive index,
a line passing between a first point in a first end side of the display in a longitudinal direction of the display and a second point in a second end side of the display opposite to the first end side is defined as a longitudinal axis, the second point being at a same height as the first point,
an angle between the rolling direction of the resin sheet and a virtual image longitudinal axis, which corresponds to the longitudinal axis, of the virtual image of the display reflected by the reflector is defined as an angle α, and
a luminance of the virtual image is adjusted by adjusting the angle α, the angle α is adjusted by rotating the dust-proof cover.

2. The vehicle head-up display device according to claim 1, wherein
a luminance of the light emitting element is $l_0$,
a transmittance of the display is $T_{TFT}$,
a reflectance of the reflector is R,
an angle between the longitudinal axis and a polarization direction of the display light is $\theta_{LCD}$,
an angle between a virtual plane and a plane is defined as an angle $\Delta\theta$, the virtual plane being defined by an incident light and a reflected light of the display light when reflected on the windshield or the combiner, and the plane being perpendicular to the virtual image longitudinal axis of the virtual image of the display reflected by the reflector,
a reflectance of an s-polarized light on the windshield or the combiner is Rs,
a reflectance of a p-polarized light on the windshield or the combiner is Rp,
values determined by a characteristic of the dust-proof cover are $A_1$ and $A_2$,
a luminance I of the display information, when visually recognized as the virtual image from the driver's seat, is represented by the following Expression 1:

$$I=(I_0 \cdot T_{TFT} \cdot R) \times [Rs \cdot \{A_1 \cos^2(\theta_{LCD}+\Delta\theta-2\alpha)+A_2 \cos^2(\theta_{LCD}+\Delta\theta)\}+Rp \cdot \{A_1 \sin^2(\theta_{LCD}+\Delta\theta-2\alpha)+A_2 \sin^2(\theta_{LCD}+\Delta\theta)\}] \quad \text{[Expression 1]}$$

and
the angle α is selected so that the luminance I falls within a range of from 65% to 90% of a maximum value of the luminance I.

3. The vehicle head-up display device according to claim 2, wherein
the values $A_1$ and $A_2$ are set to satisfy $0.3<A_1<0.5$ and $0.39<A_2<0.59$, respectively.

4. The vehicle head-up display device according to claim 1, wherein
a luminance of the light emitting element is $l_0$,
a transmittance of the display is $T_{TFT}$,
a reflectance of the reflector is R,
an angle between the longitudinal axis and a polarization direction of the display light is $\theta_{LCD}$,
an angle between a virtual plane and a plane is defined as an angle $\Delta\theta$, the virtual plane being defined by an incident light and a reflected light when the display light is reflected on the windshield or the combiner, and the plane being perpendicular to the virtual image longitudinal axis of the virtual image of the display reflected by the reflector, a reflectance of an s-polarized light on the windshield or the combiner is Rs, a reflectance of a p-polarized light on the windshield or the combiner is Rp, values determined by a characteristic of the dust-proof cover are $A_1$ and $A_2$, a luminance I of the display information, when visually recognized as the virtual image from the driver's seat, is represented by the following Expression 1:

$$I=(I_0 \cdot T_{TFT} \cdot R) \times [Rs \cdot \{A_1 \cos^2(\theta_{LCD}+\Delta\theta-2\alpha)+A_2 \cos^2(\theta_{LCD}+\Delta\theta)\}+Rp \cdot \{A_1 \sin^2(\theta_{LCD}+\Delta\theta-2\alpha)+A_2 \sin^2(\theta_{LCD}+\Delta\theta)\}] \quad \text{[Expression 1]}$$

and the angle $\alpha$ is selected so that the luminance I becomes a value other than a maximum value and a minimum value of the luminance I.

5. The vehicle head-up display device according to claim 1, wherein a luminance of the light emitting element is $I_0$, a transmittance of the display is $T_{TFT}$)

a reflectance of the reflector is R, an angle between the longitudinal axis and a polarization direction of the display light is $\theta_{LCD}$, an angle defined between a virtual plane and a plane is defined as an angle $\Delta\theta$, the virtual plane being defined by an incident light and a reflected light when the display light is reflected on the windshield or the combiner, and the plane being perpendicular to the virtual image longitudinal axis of the virtual image of the display reflected by the reflector, a reflectance of an s-polarized light on the windshield or the combiner is Rs, a reflectance of a p-polarized light on the windshield or the combiner is Rp, values determined by a characteristic of the dust-proof cover are $A_1$ and $A_2$, a luminance I of the display information, when visually recognized as the virtual image from the driver's seat, is represented by the following Expression 1, $$I=(I_0 \cdot T_{TFT} \cdot R) \times [Rs \cdot \{A_1 \cos^2(\theta_{LCD}+\Delta\theta-2\alpha)+A_2 \cos^2(\theta_{LCD}+\Delta\theta)\}+Rp \cdot \{A_1 \sin^2(\theta_{LCD}+\Delta\theta-2\alpha)+A_2 \sin^2(\theta_{LCD}+\Delta\theta)\}] \quad \text{[Expression 1]}$$

and the angle $\alpha$ is selected so that the luminance I has a maximum value of the luminance I.

6. The vehicle head-up display device according to claim 1, wherein the dust-proof cover is made of polycarbonate.

7. The vehicle head-up display device according to claim 1, wherein the dust-proof cover is made of acrylic.

8. The vehicle head-up display device according to claim 1, wherein the dust-proof cover is made of the resin sheet formed through a rolling process.

\* \* \* \* \*